(12) United States Patent
Ardavanis et al.

(10) Patent No.: US 9,249,900 B2
(45) Date of Patent: Feb. 2, 2016

(54) LAYING OF CONDUIT AT SEA USING HORIZONTAL REELS

(71) Applicant: SAIPEM S.p.A., San Donato Milanese (IT)

(72) Inventors: Kimon Tullio Ardavanis, San Donato Milanese (IT); Michele Vinciguerra, Milan (IT); Dario Donelli, Milan (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 14/370,792

(22) PCT Filed: Dec. 4, 2012

(86) PCT No.: PCT/EP2012/074385
§ 371 (c)(1),
(2) Date: Jul. 7, 2014

(87) PCT Pub. No.: WO2013/102527
PCT Pub. Date: Jul. 11, 2013

(65) Prior Publication Data
US 2015/0139736 A1    May 21, 2015

(30) Foreign Application Priority Data
Jan. 5, 2012  (GB) .................................. 1200127.7

(51) Int. Cl.
*F16L 1/12*     (2006.01)
*B63B 35/03*   (2006.01)
(Continued)

(52) U.S. Cl.
CPC .................. *F16L 1/203* (2013.01); *B63B 35/03* (2013.01); *F16L 1/12* (2013.01); *F16L 1/205* (2013.01); *F16L 1/23* (2013.01)

(58) Field of Classification Search
CPC .............. F16L 1/12; F16L 1/14; B63B 35/03; B63B 35/04
See application file for complete search history.

(56) References Cited

U.S. PATENT DOCUMENTS 3,372,461 A * 3/1968 Tesson ........................ 405/168.3
3,630,461 A * 12/1971 Sugasti et al. ............. 405/168.3
(Continued)

FOREIGN PATENT DOCUMENTS

CA         2287711 A1 * 12/2000
WO    WO 00/66922 A1    11/2000
(Continued)

OTHER PUBLICATIONS
International Search Report (PCT/ISA/210) mailed on Feb. 18, 2013, by the European Patent Office as the International Searching Authority for International Application No. PCT/EP2012/074385.
(Continued)

*Primary Examiner* — Frederick L Lagman
(74) *Attorney, Agent, or Firm* — Buchanan Ingersoll & Rooney PC

(57) ABSTRACT

A method of laying conduit at sea from a reel vessel includes the steps of laying conduit, for example pipeline or umbilical, from a first reel which rotates about a first substantially vertical axis. Conduit is laid from a second reel of conduit rotating about a second substantially vertical axis spaced apart from the first axis. A portion of the route travelled by the conduit during the step of laying conduit from the first reel of conduit is substantially the same as a portion of the route travelled by the conduit during the step of laying conduit from the second reel of conduit, for example, the conduit from the second reel may pass around a part of the periphery of the first reel and then follow substantially the same path as previously travelled by the conduit laid from the first reel.

23 Claims, 13 Drawing Sheets

(51) Int. Cl.
  *F16L 1/20* (2006.01)
  *F16L 1/23* (2006.01)

(56) References Cited

U.S. PATENT DOCUMENTS

| | | | | |
|---|---|---|---|---|
| 3,680,342 A | * | 8/1972 | Mott et al. | 405/168.3 |
| 3,712,100 A | * | 1/1973 | Key et al. | 405/168.3 |
| RE28,410 E | * | 5/1975 | Cox et al. | 405/168.3 |
| 4,659,253 A | * | 4/1987 | Jacobson | 405/171 |
| 5,346,333 A | | 9/1994 | Maloberti et al. | |
| 6,371,694 B1 | | 4/2002 | de Varax et al. | |
| 2007/0258772 A1 | * | 11/2007 | Bursaux et al. | 405/168.3 |
| 2013/0051920 A1 | | 2/2013 | Roodenburg et al. | |
| 2013/0216315 A1 | * | 8/2013 | Pionetti et al. | 405/168.3 |

FOREIGN PATENT DOCUMENTS

| | | |
|---|---|---|
| WO | WO 03/095880 A1 | 11/2003 |
| WO | WO 2008/078983 A1 | 7/2008 |
| WO | WO 2011/105894 A1 | 9/2011 |

OTHER PUBLICATIONS

Written Opinion (PCT/ISA/237) mailed on Feb. 18, 2013, by the European Patent Office as the International Searching Authority for International Application No. PCT/EP2012/074385.

* cited by examiner

LAYING OF CONDUIT AT SEA USING HORIZONTAL REELS

BACKGROUND OF THE INVENTION

The present invention concerns a method of laying of conduit at sea using one or more horizontal reels, each reel thus having a substantially vertical axis, and a vessel for performing such a method. The present invention is particularly, but not exclusively, concerned with laying of pipeline with reel vessels.

A reel vessel is a ship or barge specially designed to handle a pipeline that is wound onto a large and massive reel. Reel vessels are therefore relative large and massive and are used predominantly for laying flexible pipeline, rigid pipeline, and risers, and sometimes umbilical. Pipe-laying from a reel vessel has the great benefit of allowing the bulk of the welding, coating and inspecting of the pipeline to be carried out in factory conditions ashore to form a continuous length of pipe, which is then spooled onto a storage reel on the vessel, prior to being unspooled during pipe-lay operations. Unspooling pipe from a reel at sea requires a complex, specialized lay vessel, particularly when laying relatively long or larger diameter pipelines. An alternative method of pipeline laying is referred to as stove-piping, in which pipeline is formed by means of welding separate sections of pipe together on the vessel and welding such sections to the end of a pipeline leading to the ocean floor. Reel pipe-laying using existing arrangements is generally preferable to stove-piping, on economic grounds, for rigid pipelines having an outer diameter of 16" (about 400 mm) or less.

In the case of laying pipeline from a reel vessel with a permanently fitted reel, when the reel is empty, the reel vessel has to move to an onshore facility to receive a new length of pipeline onto the reel. The onshore facility typically comprises an assembly line with at least one working station to join pipe sections end to end. After assembly of the pipeline to be laid, said pipeline is spooled (wound), onto the permanent reel of the pipelaying vessel. After completely filling the reel, the pipelaying vessel can return to continue the pipelaying process.

A drawback of the current reel pipelaying systems is that spooling is a time-consuming and inefficient process. Solutions offered in the prior art include providing a vessel with a vertical reel that is removably mounted on the vessel (see WO 2011/105894—Itrec) and having a vessel with multiple vertical reels (WO 00/66922—Coflexip). Vertical reel vessels (i.e. vessels arranged to support a reel with the axis of the reel being general horizontal) have the advantage of the reel having a relatively small footprint on the vessel and therefore offering the possibility of making relatively efficient use of space on deck. However, mounting a reel with the axis of rotation vertical (i.e. a so-called horizontal reel) has the advantage of stability, lowering the centre of gravity and potentially allowing for a simpler support structure for the reel, in view of the loads that the vessel needs to withstand as compared between a vertical reel and a horizontal reel.

The present invention seeks to mitigate one or more of the above-mentioned problems. Alternatively or additionally, the present invention seeks to provide an improved reel vessel. Alternatively or additionally, the present invention seeks to provide a more efficient and/or less time consuming method of laying pipeline from a reel vessel.

SUMMARY OF THE INVENTION

The present invention provides, according to a first aspect, a method of laying conduit at sea from a reel vessel, wherein the method includes the steps of (a) laying conduit from a first reel of conduit, the first reel rotating about a first substantially vertical axis, and (b) laying conduit from a second reel of conduit, the second reel rotating about a second substantially vertical axis spaced apart from the first substantially vertical axis, wherein a portion of the route travelled on the vessel by the conduit during the step of laying conduit from the first reel of conduit is substantially the same as a portion of the route travelled by the conduit during the step of laying conduit from the second reel of conduit. Such an arrangement may be facilitated by the conduit from the second reel passing around at least part of the periphery of the first reel, and preferably then following substantially the same route from the first reel to the point at which the conduit leaves the vessel. Thus, efficient space may be used on the vessel, for example on deck, because once a suitable route has been provided for conduit to travel from the second reel to a point at which the conduit can utilize the route used during laying of conduit from the first reel, no further special equipment need be provided. Utilizing such equipment/route, or part thereof, both for laying conduit from the first reel and for laying conduit from the second reel also facilitates an efficient, cost-effective, and speedy means for laying conduit on a lay-project where the length of conduit to be laid needs to be accommodated on more than one reel. The conduit from the second reel may pass along a curved path that at least partially circumnavigates around the first reel (for example, broadly following its circumference, whether spaced apart therefrom or not).

In accordance with a second aspect of the invention there is provided a method of laying conduit at sea from a reel vessel, wherein the method includes the steps of (a) laying conduit from a first reel of conduit, the first reel rotating about a first substantially vertical axis, and (b) laying conduit from a second reel of conduit, the second reel rotating about a second substantially vertical axis spaced apart from the first substantially vertical axis, wherein the conduit from the second reel passes around at least part of the periphery of the first reel. In this second aspect of the invention, a portion of the route travelled on the vessel by the conduit during the step of laying conduit from the first reel of conduit may (and therefore need not) be substantially the same as a portion of the route travelled downstream of the first reel by the conduit during the step of laying conduit from the second reel. It will be appreciated that features of other aspects of the invention may be incorporated into the second aspect of the invention immediately described above. The following relates to the first or second aspects of the invention.

The conduit from the second reel when passing around at least part of the periphery of the first reel, preferably passes within 10 meters and more preferably within 1 meter of the conduit supporting surface of the reel (e.g. the, typically cylindrical, surface which supports conduit wound onto the first reel). The conduit from the second reel when passing around at least part of the periphery of the first reel, preferably passes around at least 60 degrees, and more preferably at least 90 degrees, of the circumference of the conduit supporting surface of the first reel.

The route of the conduit during the step of laying conduit from the first reel of conduit is preferably the same as the route of the conduit during the step of laying conduit from the second reel of conduit for at least the majority of the route, and preferably substantially the entire route, between the point at which the conduit leaves the first reel and the point at which the conduit leaves the vessel.

Given that the conduit is laid from a reel vessel, which is suitable therefore for laying very long pipeline (typically, resulting in a very heavy reel, when fully stocked), the type of conduit laid will typically be conduit that has a function in the offshore oil and gas industry and one which is sufficiently long and/or of a suitably wide diameter to make it economically sensible for a reel vessel to be used to lay it. It will be appreciated that the conduit, whilst being laid at sea, may not be laid entirely on the ocean floor. Indeed when laying, it may be the intention for a large proportion, perhaps all, of the conduit to be held off of the ocean floor. The conduit may be in the form of pipeline. The pipeline may be configured for use as a riser. The pipeline may be rigid pipeline. The pipeline may be in the form of flexible pipeline. Rigid pipeline, as well as flexible pipeline, has at least some flexibility but reeled rigid pipeline will typically need to be plastically deformed to ensure that the pipeline once laid remains relatively straight and/or free of residual stresses. The pipeline may be made of metal. The metal pipeline may be coated with another material. The pipeline may be formed of sections welded together end-to-end to form the pipeline. The pipeline may be in the form of pipe-in-pipe pipeline. The pipeline may for example be a double-walled pipeline, the wall being defined by an inner pipe and an outer pipe. There may be more than two layers to the wall of the pipeline. The conduit may be in the form of umbilical, for example for use in the offshore gas and oil industry. Umbilical may facilitate the flow of hydraulic fluid. Umbilical may facilitate the supply of control or communications signals. Umbilical may facilitate the supply of electric power. Umbilical may facilitate the flow via one or more relatively large diameter pipes of gas/oil for bulk flows.

The conduit may have a total length on the reel of over 500 m, per reel. The conduit may have a total length on the reel of less than 100 km, per reel. The operational capacity of one of the reels may be greater than 100 tons. The reel vessel may be so configured as to be able to carry reels, in the case where one such reel, including conduit wound thereon, has a mass of 1,000 tons. The reels may each have a diameter greater than 10 m. The reels may each have a diameter less than 50 m. The conduit may have a diameter of between 10 mm and 600 mm. The length of conduit that can be held on the reel will of course depend on the diameter of the conduit. The reels may each have a capacity to hold between 10 and 50 km of conduit having a diameter of 100 mm. The reels may each have a capacity to hold between 1 and 15 km of conduit having a diameter of 400 mm. The mass per unit length of the conduit may be between 1 Kg/m and 500 Kg/m, and is preferably between 10 Kg/m and 300 Kg/m.

The method is preferably performed such that the laying of conduit from one of the first and second reels follows immediately after the conduit from the other of the first and second reels has been substantially fully unwound. The vessel may be configured such that there is only one route for conduit to take for the majority of the distance from the first reel (whether the conduit is unspooled from either the first reel or the second reel) to the point at which the conduit leaves the vessel. The vessel may be configured such that there is only one route for conduit to take from a location immediately downstream of where the conduit leaves the region of the first reel (whether being unspooled from either the first reel or the second reel) to the point at which the conduit leaves the vessel. It will be appreciated that there may be only one route in the sense that only one length of conduit can be laid along that route at a given time, but that the route may vary in three-dimensional space, as for example conduit handling equipment is adjusted and/or moved on the vessel. Thus, the route may be defined by means of the items of conduit-laying equipment with which a conduit interacts (for example, rests on, passes through, changed by, monitored by, or the like) as opposed to the exact path taken through space relative to the vessel by the conduit as it is laid. For example, it will be appreciated that the vertical position of the conduit at a given point on the route, especially near the reel from which the conduit is being unspooled, may vary in dependence on the position of the conduit on the spool (in the direction of the axis of the reel). Any such variations should not be considered as representing a different route by the conduit. The route of the conduit during the step of laying conduit from the first reel of conduit may pass via a plurality of different items, possibly four or more items, of conduit-laying equipment on the vessel. The route of the conduit during the step of laying conduit from the second reel of conduit preferably also passes via the same plurality of different items of conduit-laying equipment on the vessel. Thus, conduit may pass via four or more of the same items of conduit-laying equipment on the vessel whether being laid from the first reel or from the second reel. The conduit-laying equipment on the vessel may include one or more rollers. Such rollers may for example be arranged to support and/or guide the conduit along its route. The conduit-laying equipment on the vessel may include one or more items of pipe-handling equipment. The conduit-laying equipment on the vessel may include one or more pipe-straightening devices. Such pipe-straightening devices are advantageously arranged to deform the conduit and reduce the amount of curvature in the conduit (preferably substantially straightening the conduit), for example in the case where the conduit has been plastically deformed in order to spool it onto the reel. The conduit-laying equipment on the vessel may include one or more tensioners for applying tension to the conduit. Such tensioners may be in the form of a device having one or more tensioner tracks which are able to hold the conduit under tension. The tension in the conduit as it leaves the vessel may be greater than 10 kN (1 metric ton). The tension in the conduit being laid may be greater than 100 kN (10 tons) at the surface of the ocean. The vessel may also include a crane, for example of a kind suitable for transferring a fully wound reel of pipe from one part of the vessel to another. The conduit-laying equipment on the vessel may include one or more chutes, bathers, or other guiding members.

The items of conduit-laying equipment mentioned above may refer to those that are positioned on deck only. The point at which the conduit leaves the vessel may be defined at least in part, or be positioned immediately downstream of, a stinger or ramp leading from the vessel. For the purpose of the above-mentioned features relating to which items of conduit-laying equipment are present along the route(s) that conduit follows from the reel(s) up to where the conduit leaves the vessel, such a stinger or ramp (and any items of conduit-laying equipment located thereon) may be discounted from consideration. For example, in the case where a route of the conduit during the step of laying conduit from the second reel of conduit passes via the same plurality of different items of conduit-laying equipment on the vessel as when laying from the first reel, the same plurality of different items of conduit-laying equipment on the vessel may, optionally, be counted excluding any stinger (or equivalent ramp) and any items of conduit-laying equipment located thereon.

The step of laying conduit from the second reel of conduit may include rotating both the first reel and rotating the second reel. The second reel may be rotated to unspool the conduit whereas the first reel may be rotated to guide the conduit around the first reel. In this arrangement, the first reel may be considered as performing the function of a pulley wheel, or sheave. The surface of the first reel which performs such a guiding function when laying from the second reel may be the same cylindrical surface that supports conduit when wound on the first reel. Alternatively, or additionally, a different surface may be used. The step of laying conduit from the second reel of conduit may include passing conduit via one or more guide members positioned around the periphery of the first reel. The one or more guide members may be different from the means used to guide the conduit when performing the step of laying conduit from the first reel of conduit. For example, the one or more guide members positioned around the periphery of the first reel may support and guide the conduit from the second reel, whilst maintaining the conduit in spaced apart relation with the cylindrical surface of the first reel on which conduit is wound, and from which conduit is unspooled, when laying conduit from the first reel. (It will be appreciated that the guide members may therefore perform no guiding function when laying conduit from the first reel.)

The method may include a step of laying conduit from a third reel of conduit, the third reel rotating about a third substantially vertical axis. The third substantially vertical axis is spaced apart from both the first and second substantially vertical axes. Preferably a portion of the route travelled by the conduit during the step of laying conduit from the third reel of conduit is substantially the same as a portion of the route travelled by the conduit during the step of laying conduit from the first reel of conduit. The route of the conduit during the step of laying conduit from the first reel of conduit is preferably the same as the route of the conduit during the step of laying conduit from the third reel of conduit at least insofar as the majority of the route, and preferably substantially the entire route, between the point at which the conduit leaves the first reel and the point at which the conduit leaves the vessel. The conduit from the third reel preferably passes around at least part of the periphery of the first reel. As a result of the present invention, it has been found that as many as three separate independently mounted horizontal reels may be accommodated on a reel vessel, which is especially surprising given the size of such reels and the need to configure and arrange the associated conduit-handling equipment for laying from each such reel. Having three reels all ready to lay conduit, one after the other, allows for more efficient use of the reel vessel and allows for at least three reels' worth of product to be laid without requiring any conduit to be spooled onto an empty reel or for an empty reel to be otherwise replaced with a full reel. The present invention is of particular advantage in relation to a reel vessel being configured to carry one of (a) only two horizontal reels, mounted for rotation (to facilitate laying of conduit from the reel) about respective spaced-apart substantially vertical axes and (b) only three horizontal reels, mounted for rotation (to facilitate laying of conduit from the reel) about respective spaced-apart substantially vertical axes. It is however within the scope of the present invention to provide a reel vessel with four horizontal reels, each reel being mounted for rotation about different substantially vertical axes and being capable of paying out conduit, wherein each reel shares a portion of the route travelled on the vessel by the conduit with at least one other reel. It is also within the scope of the present invention to provide a reel vessel with two or three horizontal reels, all being mounted for rotation and capable of paying out conduit, wherein the vessel also carries one or more other reels that are provided for the purpose of replenishing or replacing said two or three horizontal reels.

At least one of the first reel and the second reel may be fixed on the vessel and arranged whereby, when replenishing the vessel with conduit for laying, the conduit needs to be spooled onto the reel in situ on the vessel. One or more of the reels on the reel vessel may be permanently mounted on the vessel.

At least one of the first reel and the second reel may be removably mounted on the vessel whereby, when replenishing the vessel with conduit for laying, an empty reel may be substituted with a replacement reel with conduit already wound thereon. The method may include a step of laying conduit from one of the first reel and the second reel, whilst simultaneously replacing the other of the first reel and the second reel with a further reel of conduit. It will be appreciated that the vessel may be arranged such that at least one the reels on the reel vessel is permanently mounted on the vessel, whereas at least another one of the reels is removably mounted on the vessel. The first reel could for example be permanently mounted and the second reel could be removably mounted.

The method is preferably such that for a given lay operation, the first reel and the second reel are used to lay the same type of conduit. It will be appreciated of course that the same vessel, and indeed the same reels, may be used to lay different types of conduit, particularly when the vessel is used on different projects. The steps of laying from the second reel and of laying from the first reel are preferably performed one after the other and on the same lay project.

The method may include a step of joining an end of the conduit from the first reel to an end of the conduit from the second reel. The joining step may take place on the vessel. The joining step may take place immediately before the respective ends of the conduits enter the sea. The joining step may include a step of bevelling the ends of the conduit to be joined. The joining step may include a step of welding the ends of the conduit together. The joining step may include a step of non-destructively testing the joint so formed. The joining step may take place after the respective ends of the conduits enter the sea, for example being performed with the assistance of an ROV.

The present invention also provides in accordance with a third aspect of the invention, a vessel for laying conduit at sea, wherein the vessel comprises a first reel station defining a first substantially vertical reel axis, and a second reel station defining a second substantially vertical reel axis spaced apart from the first substantially vertical axis. The vessel is advantageously so arranged as to be suitable for laying conduit from a reel at the first reel station and then immediately thereafter laying conduit from a reel at the second reel station. The vessel is advantageously so arranged as to be suitable for performing the methods of the first and/or second aspects of the invention. The vessel may be adapted such that a first lay route for laying conduit is defined from the first reel station to a launch position and such that a second lay route is defined from the second reel station to a launch position, the second lay route at least partially overlapping with the first lay route. Preferably, the overlapping of the second lay route and the first lay route, exists for a majority of the first lay route.

Each reel station may include a shaft or bearing means on which a reel is, or can be, mounted for rotation. The extent of a reel station may be defined by the maximum diameter of reel that the reel station is configured to be used with. The first reel station may include a reel mounted at the station. The second reel station may include a reel mounted at the station. The reel station may include a shaft on which a reel is, or can be, mounted. At least one of the first reel and the second reel may be permanently mounted on the vessel. At least one of the first reel station and the second reel station may be configured for receiving removably mountable reels. There may be advantage in having one of the first reel station and the second reel station configured for receiving removably mountable reels, but having the other of the first reel station and the second reel station provided with a permanently mounted reel.

The vessel advantageously includes one or more items of conduit-laying equipment arranged on the vessel. As mentioned above, such conduit-laying equipment may include one or more pipe-handling devices, rollers, pipe-straightening devices, tensioners, chutes, barriers, and/or guiding members. There may be at least four such items of conduit-laying equipment on the vessel, shared by each of the first and second lay routes. The vessel may for example include a conduit straightening device downstream of the first reel station. Preferably, both the first lay route and the second lay route include a portion that extends via said conduit straightening device. The vessel may additionally or alternatively include a conduit tensioning device downstream of the first reel station. Preferably, both the first lay route and the second lay route include a portion that extends via said conduit tensioning device.

The vessel may include a reel-lifting crane.

The positions of the reel stations are preferably so arranged that the first vertical axis is displaced from the position of the second vertical axis both in a direction along the length of the vessel and in a direction across the width of the vessel. Such a staggered arrangement may facilitate more efficient use of space on the vessel. The present invention recognizes that there is no need, at least insofar as making efficient use of space on the vessel, for the reels to be arranged symmetrically on the vessel. Indeed, more efficient use of the space may be achieved by mean of non-symmetrical arrangements of the reels.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
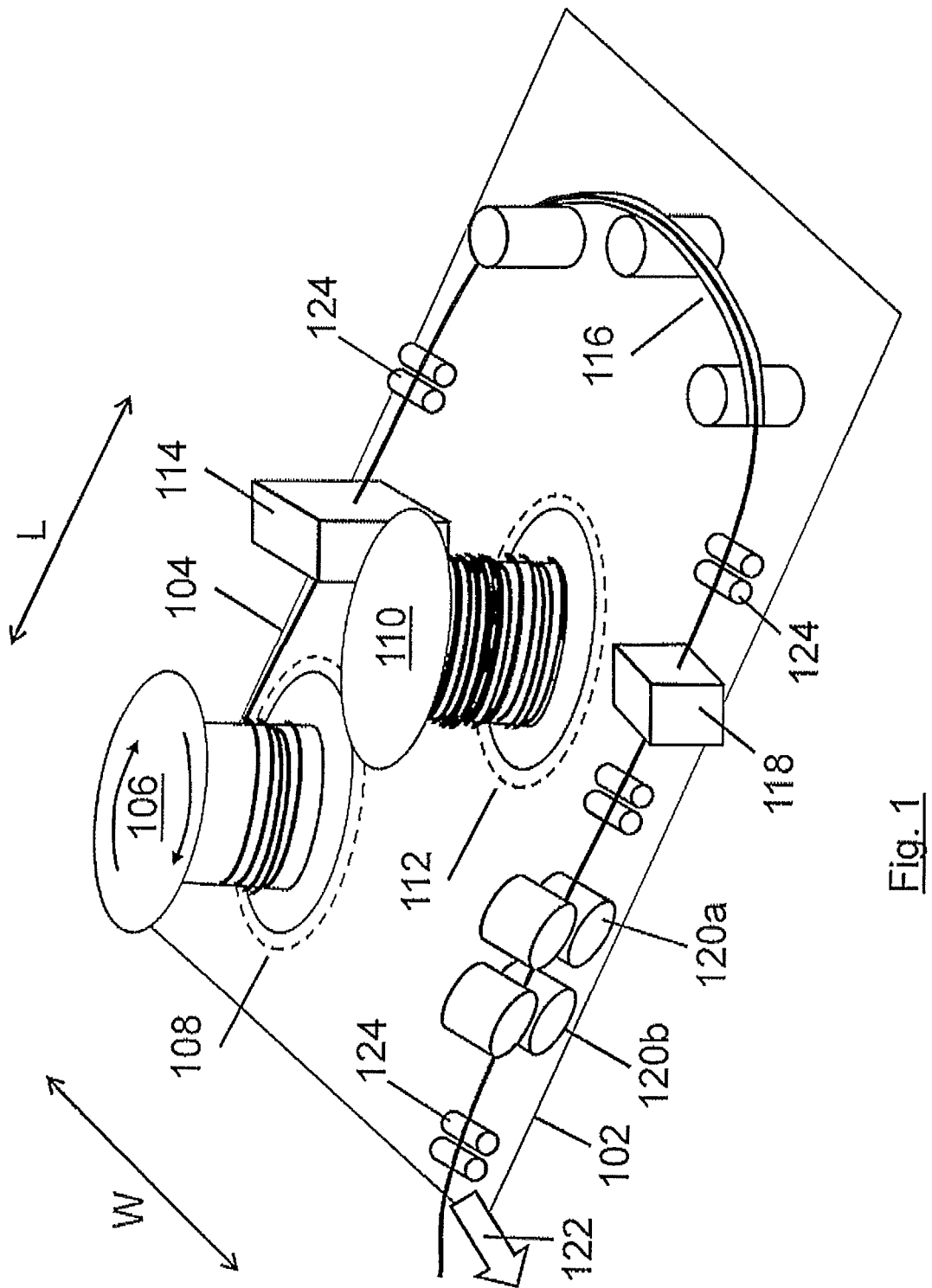
FIGS. 1 and 2 show perspective views of a portion of a vessel according to a first embodiment of the invention.

FIG. 1 shows a vessel (part only of the deck 102 being shown in FIG. 1) for laying rigid pipe 104 according to a first embodiment of the invention. The vessel includes a first horizontal pipe reel 106 at a first reel station 108 and a second horizontal pipe reel 110 at a second reel station 112. Both reels are permanently mounted on the deck 102 of the vessel for rotation about respective vertical axes spaced apart both with respect to the length L of the vessel and the width W of the vessel.

Figure 2:
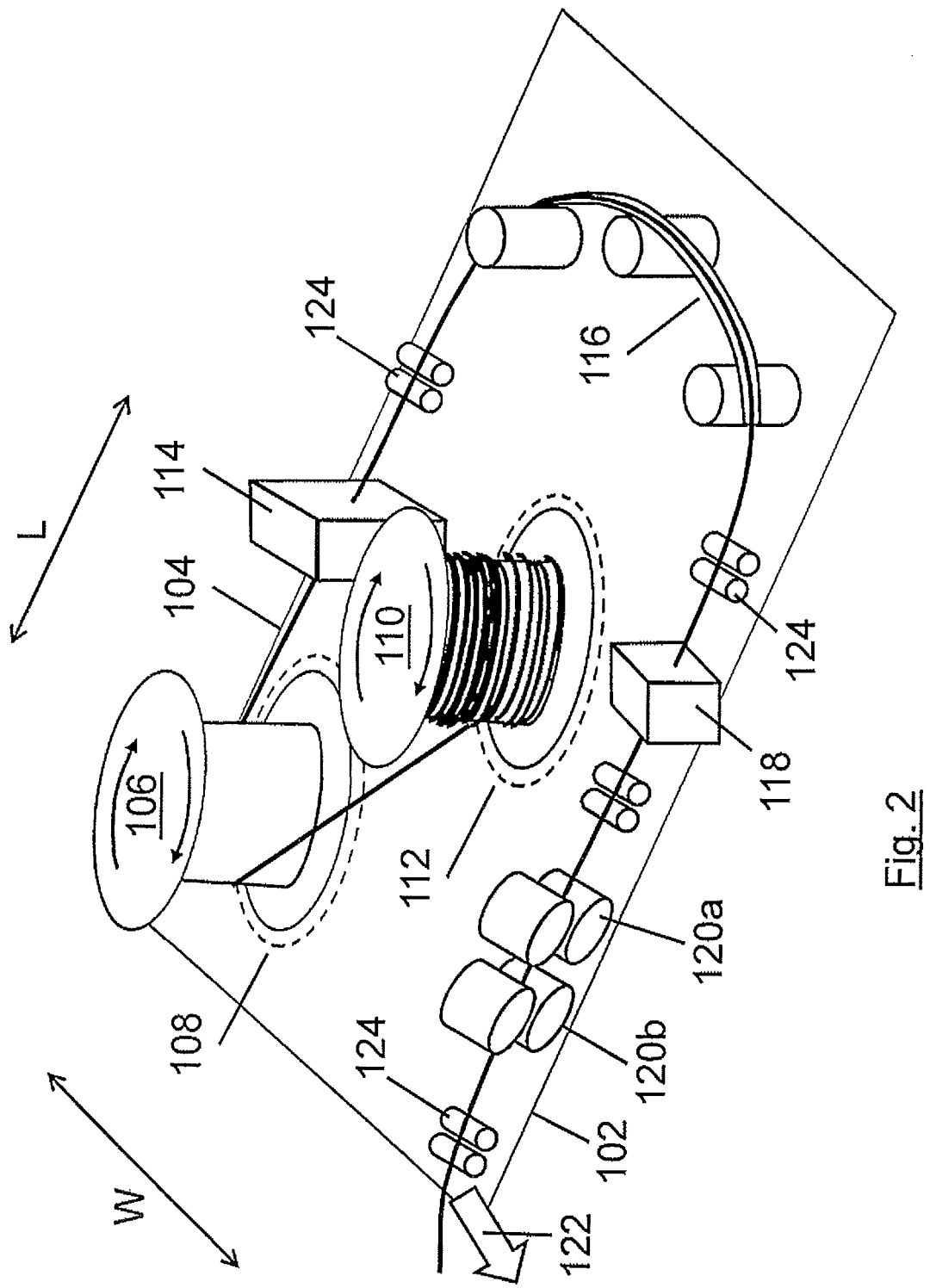

The use of the vessel to lay rigid pipe from the first reel will now be described. Rigid pipe 104 is paid out from the first reel 106 and passes via a spooling tower 114, and via an arcuate chute 116, to a pipe straightening apparatus 118. The pipe then passes via two sets of pipe tensioners 120a, 120b before exiting the vessel via a stinger ramp (not separately shown in FIG. 1 but illustrated schematically by arrow 122). The pipe is additionally supported by rollers 124 as it passes along its route. The first reel 106 rotates to pay out pipe, whereas the second reel 110 remains stationary. Once the pipe is fully dispensed from the first reel 106, the end of the pipe from the first reel is joined to an end of the pipe from the second reel. The joining of the pipe ends is performed by means of bevelling the respective ends, welding the ends together with a circumferential girth weld, non-destructive testing of the weld so formed, and then coating the weld with a coating that is compatible with the coating present on the rest of the pipeline. The pipe 104 on the second reel 110 is then paid out by means of rotating the second reel (see FIG. 2 of the drawings). The pipe 104 passes around the (empty) first reel 106 and then follows the same path to the stinger (arrow 122), as the pipe travelled on when being dispensed from the first reel 106. The first reel 106 rotates such that the pipe moves together with the reel surface, without any significant slipping therebetween. The first reel 106 is therefore used as a pulley (or sheave) during this part of the pipe-laying process.

Figure 3:
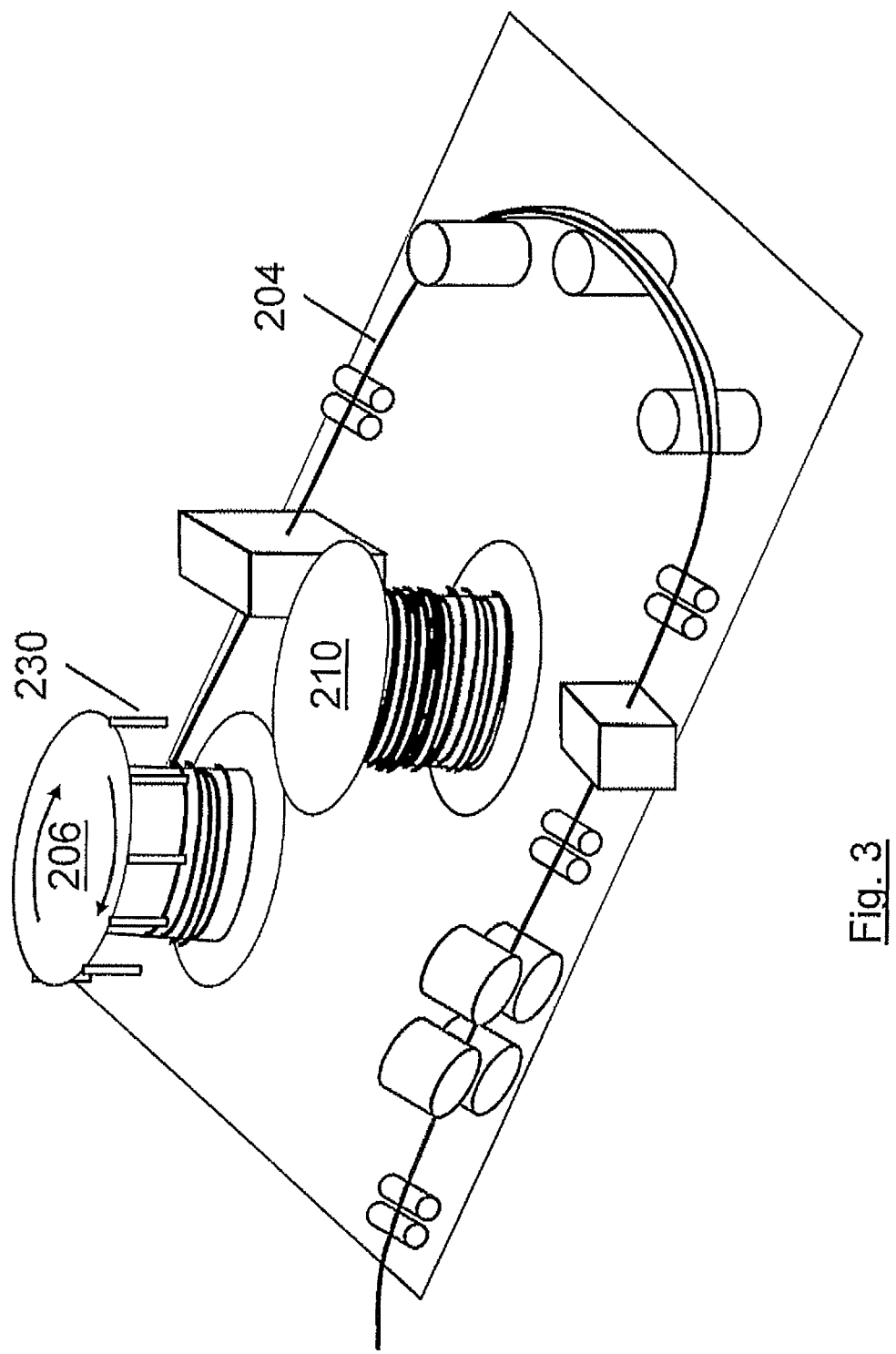
FIGS. 3 and 4 show perspective views of a portion of a vessel according to a second embodiment of the invention.
Figure 4:
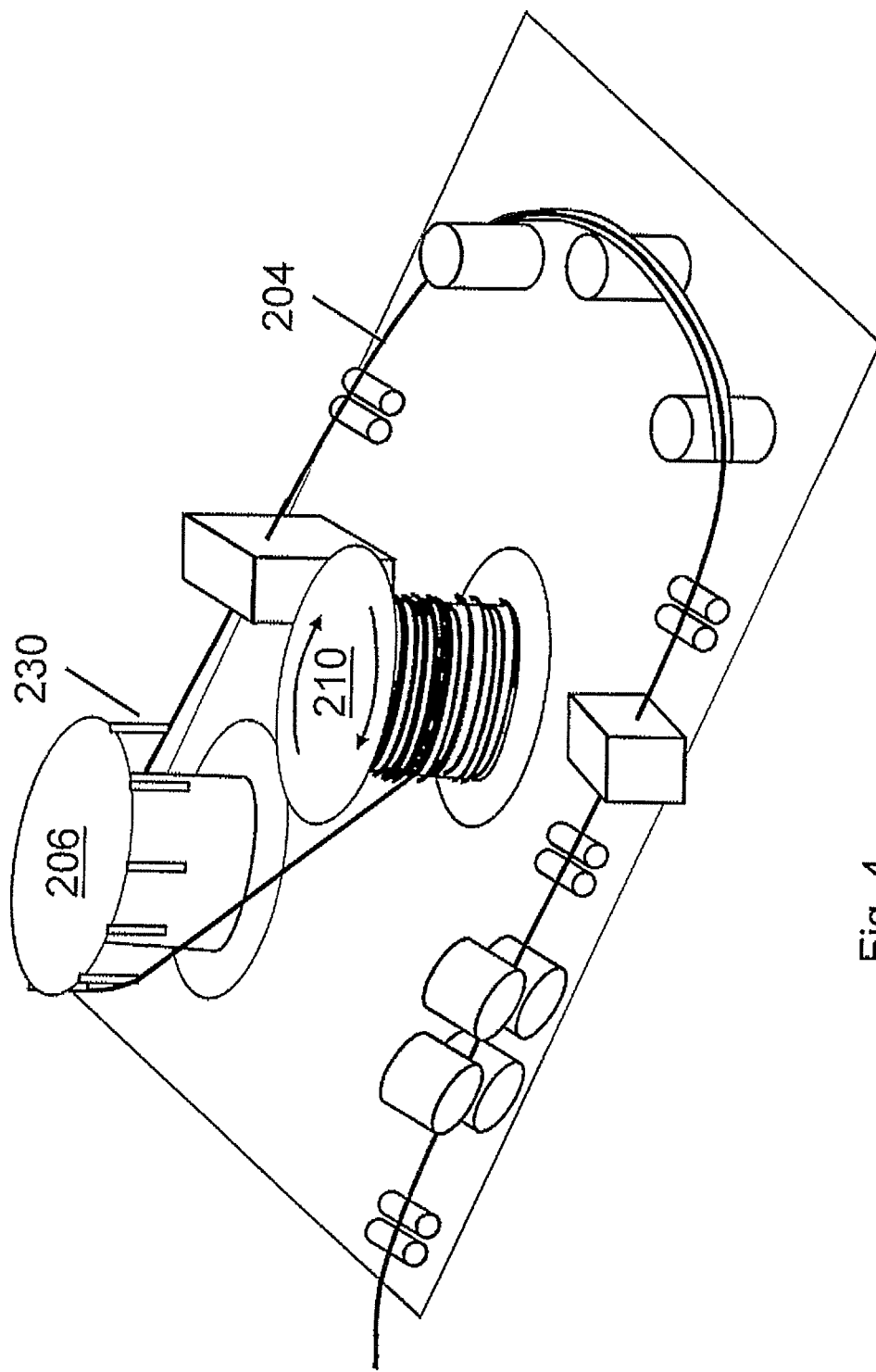

FIGS. 3 and 4 show a second embodiment similar to the first embodiment, the principal difference in operation being that, instead of using the first reel 206 as a pulley when laying pipe from the second reel 210, the pipe is passed via guide rollers 230 positioned around the periphery of the first reel 206, the first reel not rotating. The guide rollers 230 (shown schematically in FIGS. 3 and 4) are suspended from the top of reel 206 by means of support posts. FIG. 3 shows the laying of pipe 204 from the first reel 206, during which the guide rollers 230 are not used. FIG. 4 shows the laying of pipe 204 from the second reel 210, during which the guide rollers 230 are used to support and guide the pipe around the periphery of the (then non-rotating) first reel 206. The guide rollers 230 are only used to guide pipe when laying from the second reel 210. The pipe 204 otherwise follows substantially the same route from the first reel 206 to the stinger on the vessel when laying from the second reel 210 as when laying from the first reel 206.

Figure 5:
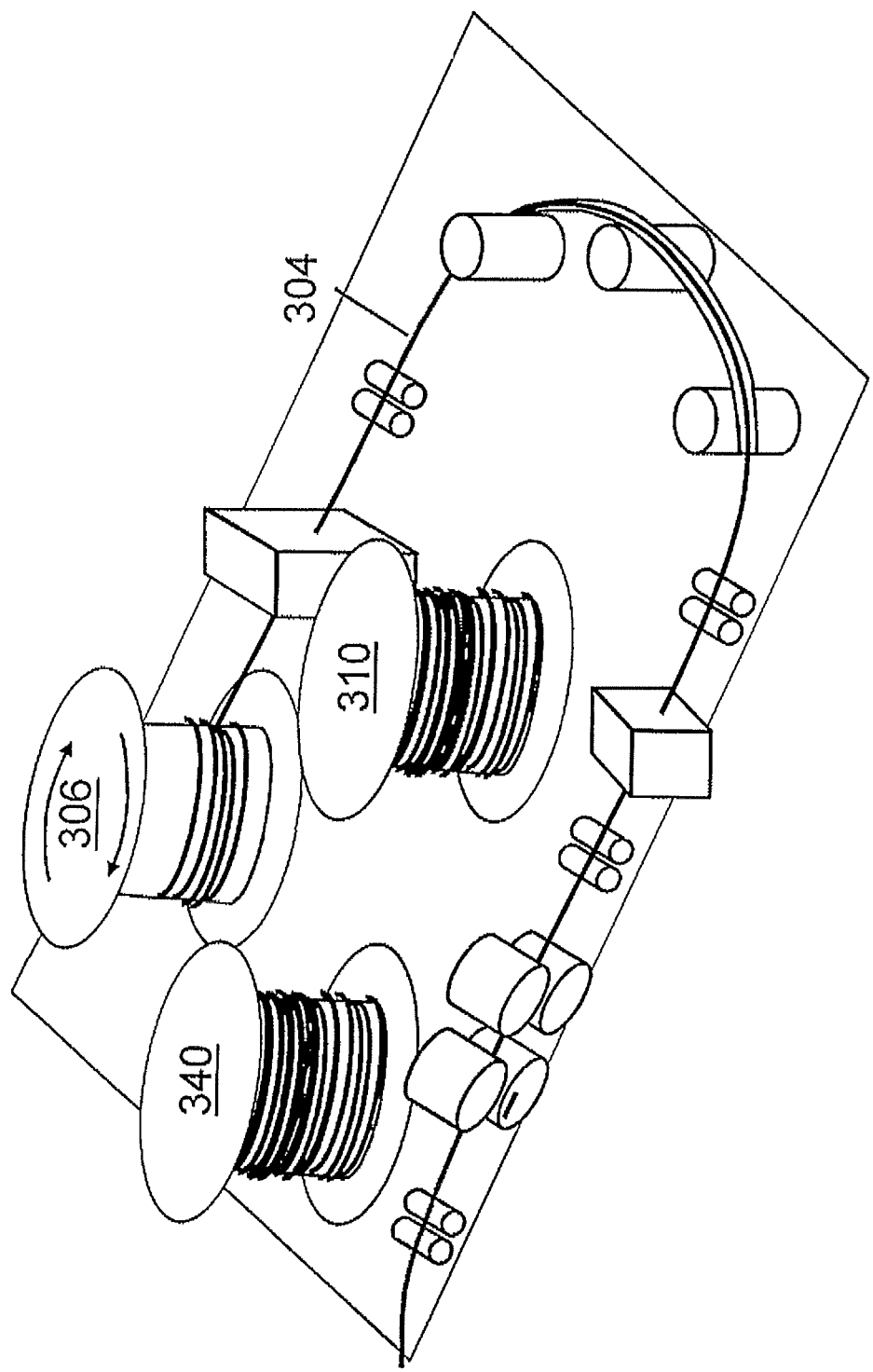
FIGS. 5 to 7 show perspective views of a portion of a vessel according to a third embodiment of the invention.
Figure 6:
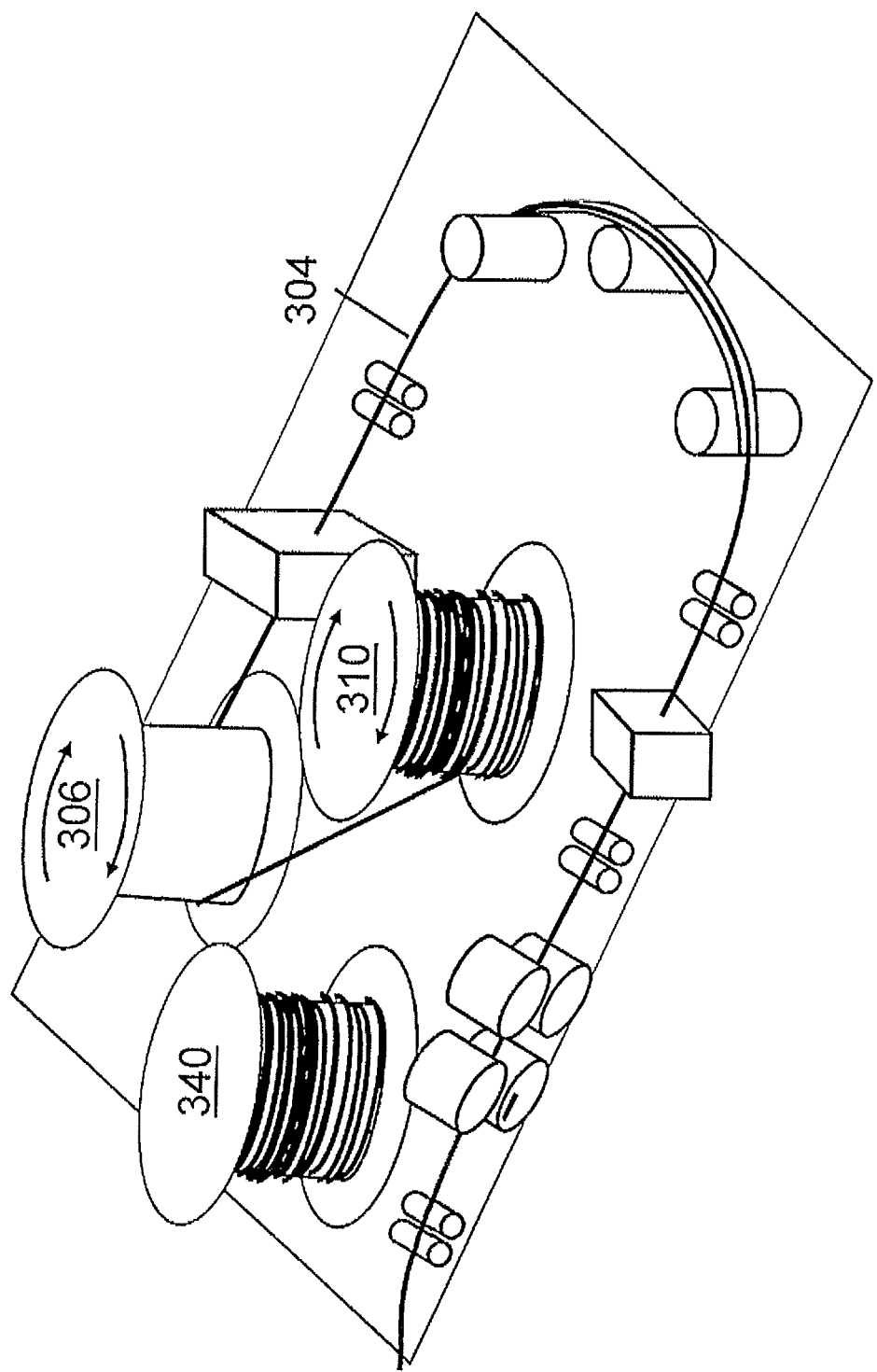
Figure 7:
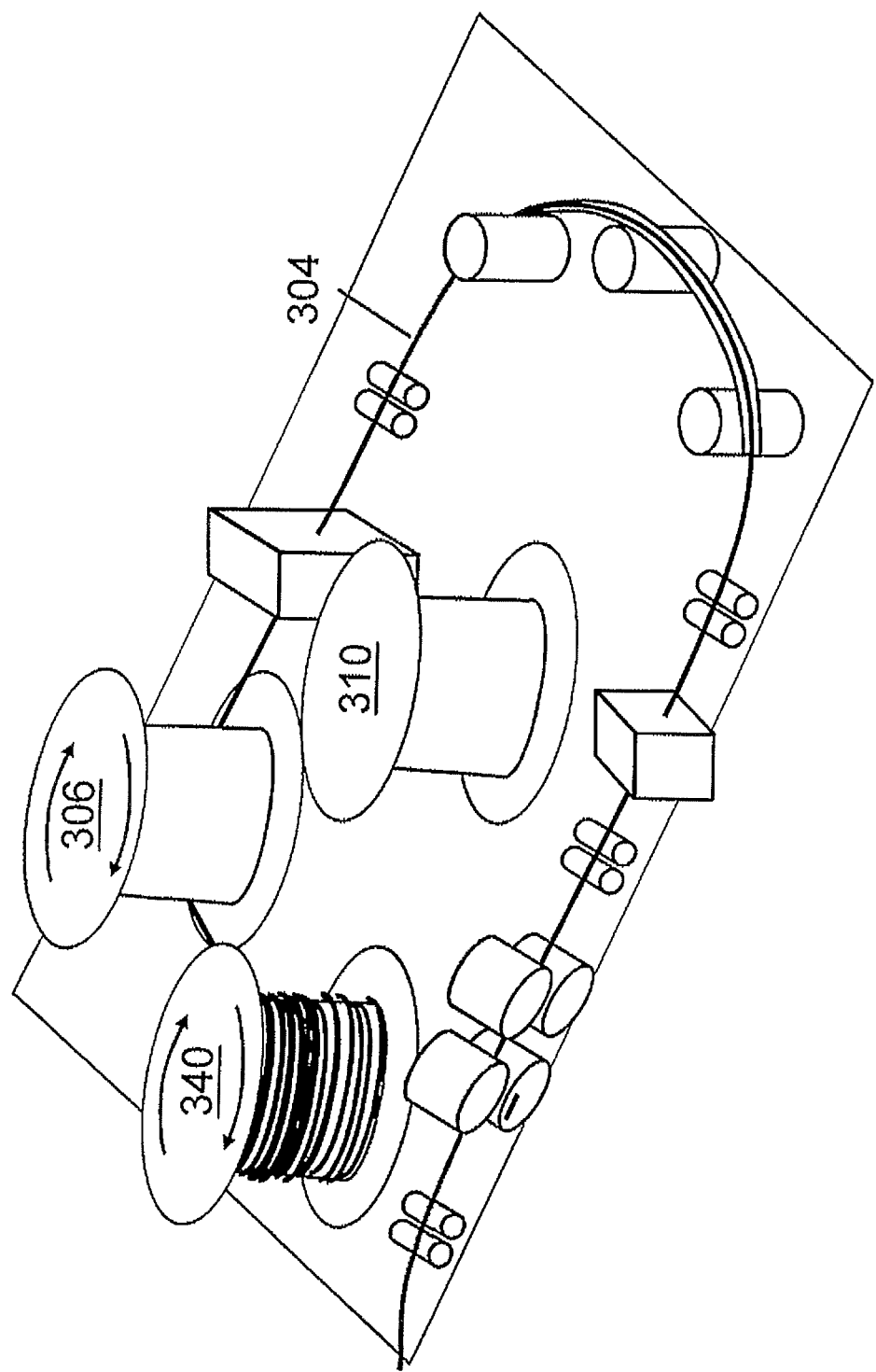
Figure 8:
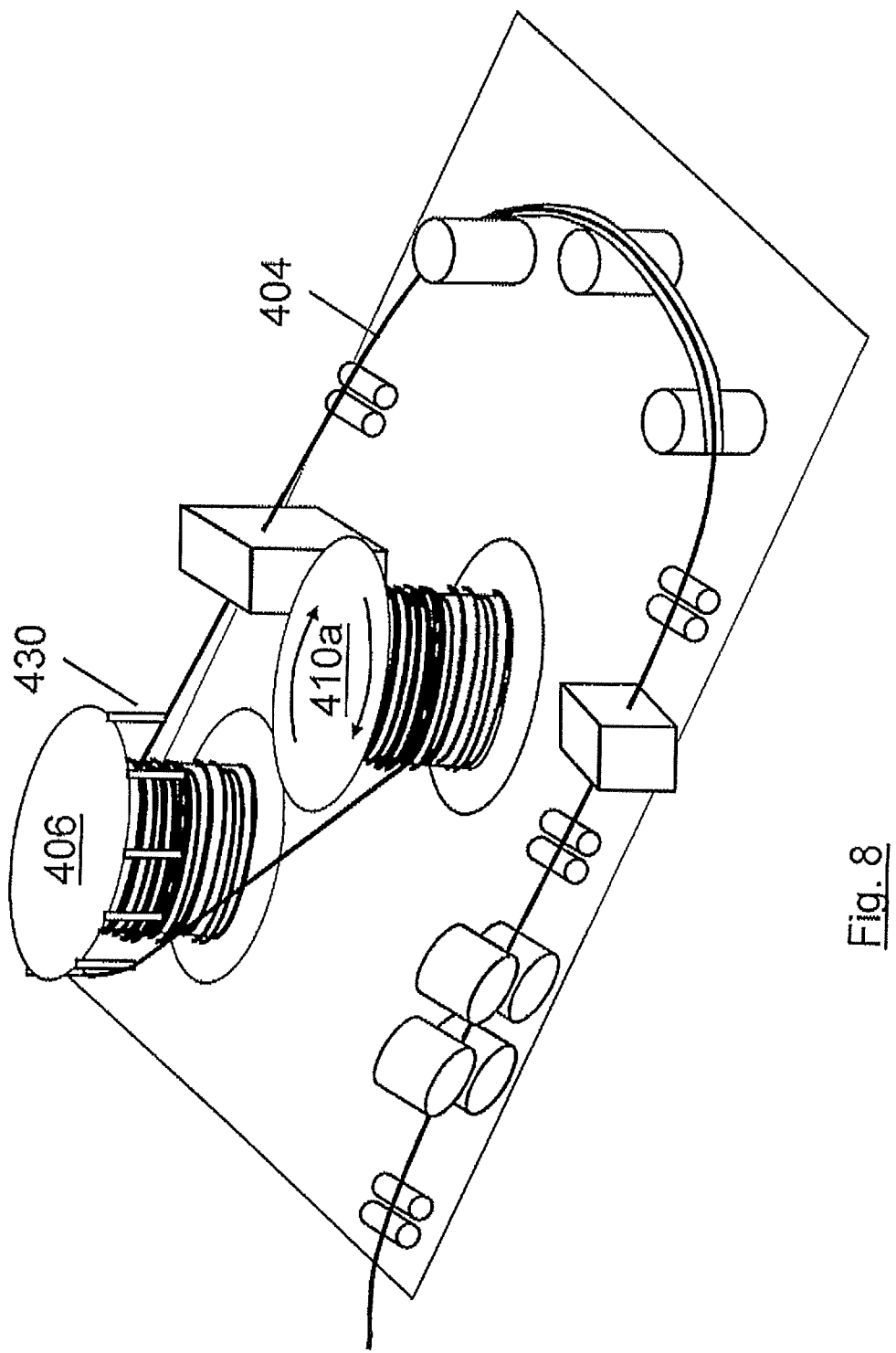
FIGS. 8 to 13 show perspective views of a portion of a vessel according to a fourth embodiment of the invention.

FIGS. 5 to 7 show a vessel according to a third embodiment, similar to the first embodiment, the principal difference being that there is a third reel 340 in addition to the first reel 306 and the second reel 310. The vessel can be used to lay pipe from three reels in succession. Pipe 304 is laid from the first reel 306. After all the pipe 304 on the first reel 306 has been paid out, the pipe on the second reel 310 is fed via the periphery of the first reel 306, the first reel being used as a pulley, the pipe 304 passing via the same route along the deck from the first reel 306 to the stinger (see FIG. 6). After all the pipe 304 on the second reel 310 has been paid out, the pipe on the third reel 340 is then fed, also via the periphery of the first reel 306, the first reel again being used as a pulley (see FIG. 7). The pipe 304 when being laid from the third reel 340 passes via substantially the same route along the deck from the first reel 306 to the stinger, as when pipe is laid from either the first reel 306 or from the second reel 310.

Figure 9:
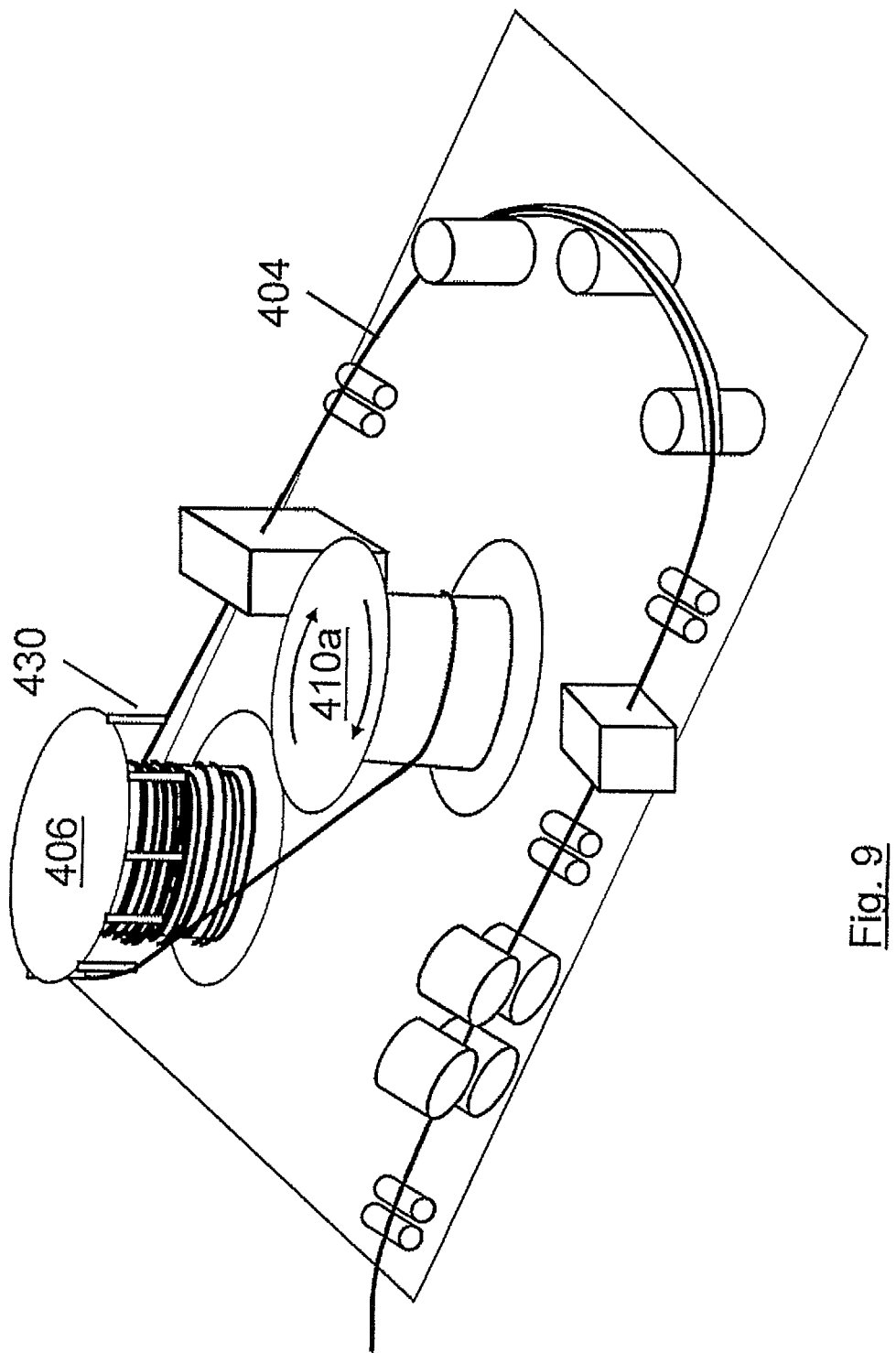
Figure 10:
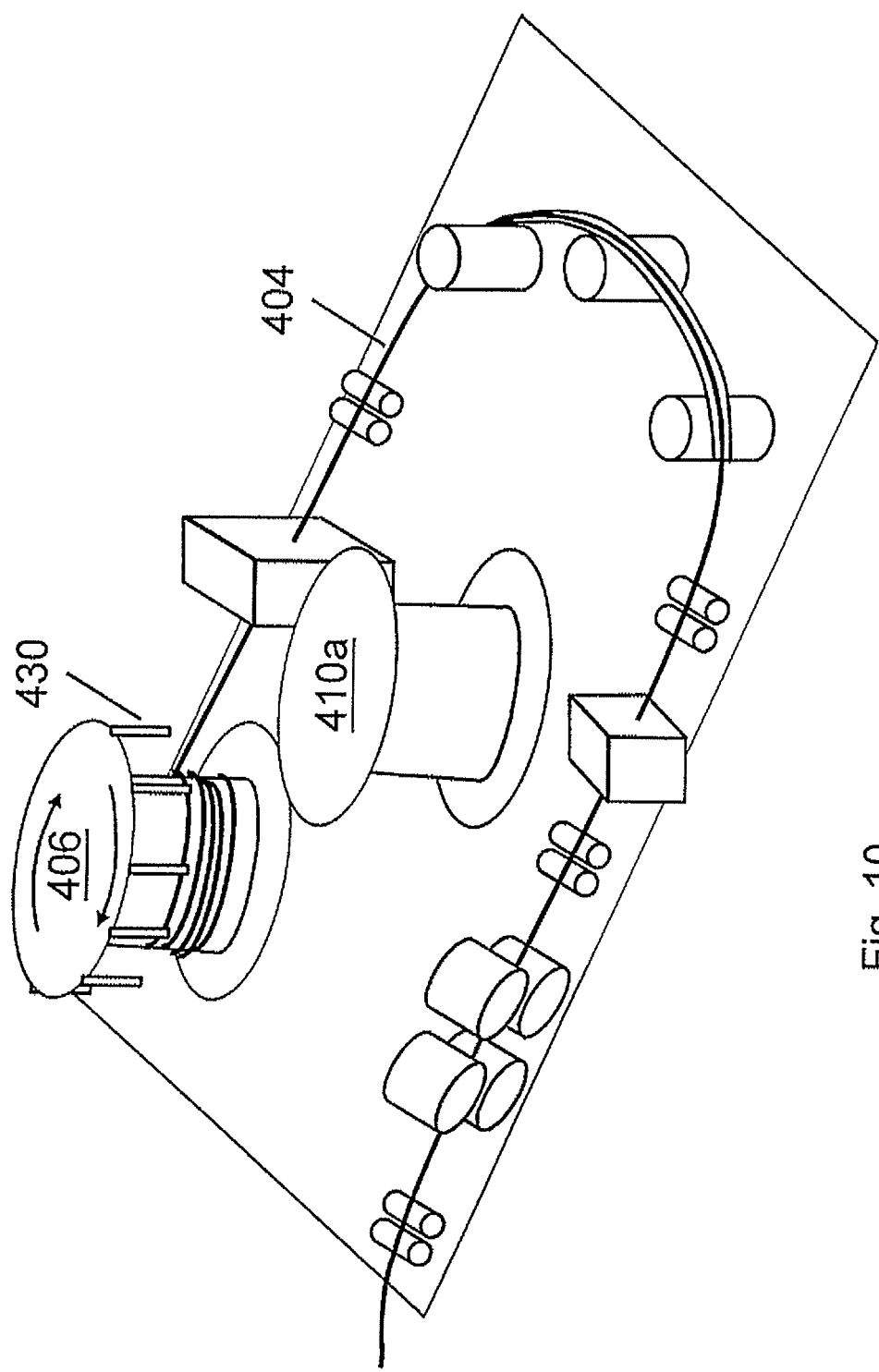
Figure 11:
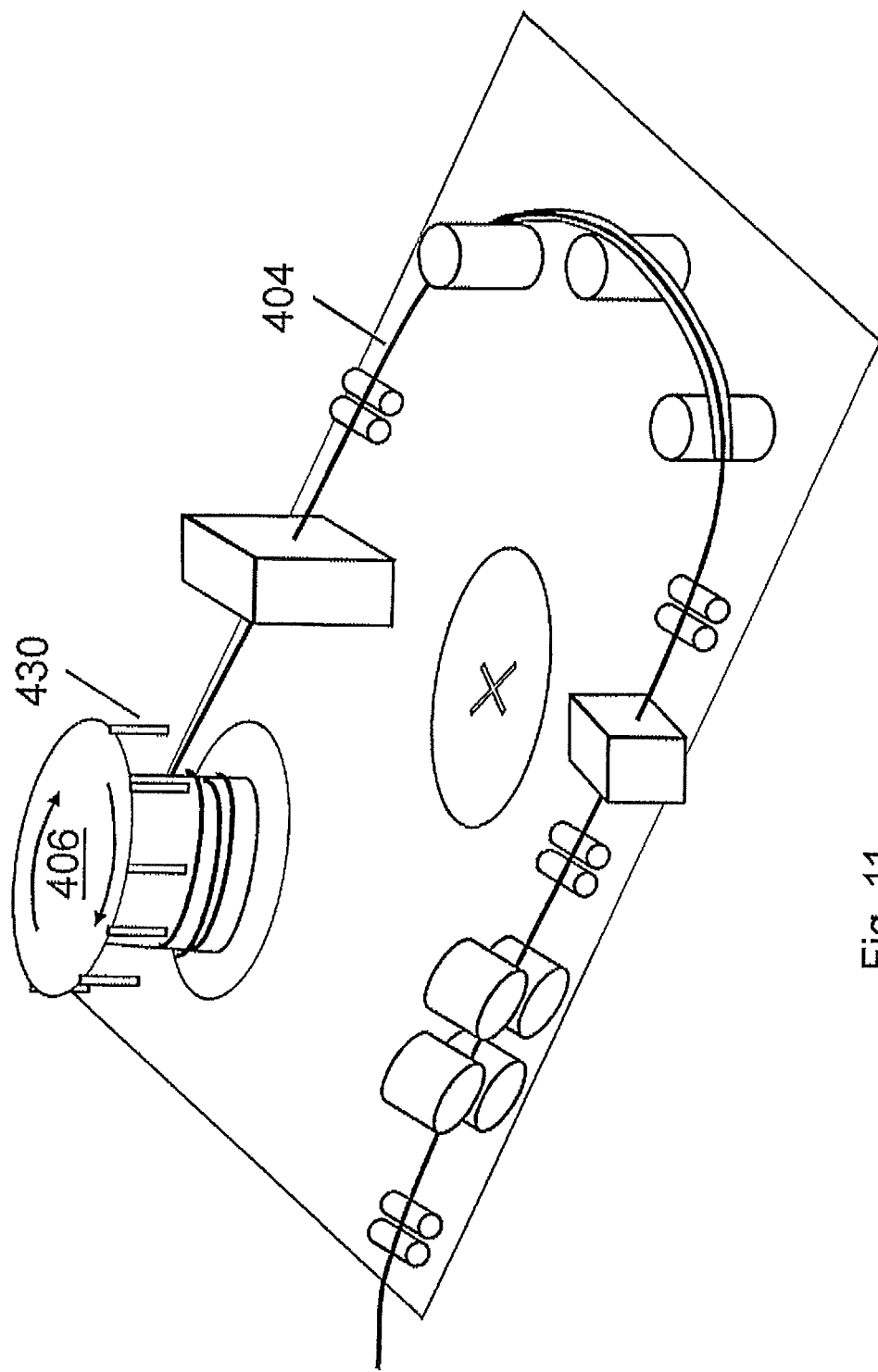
Figure 12:
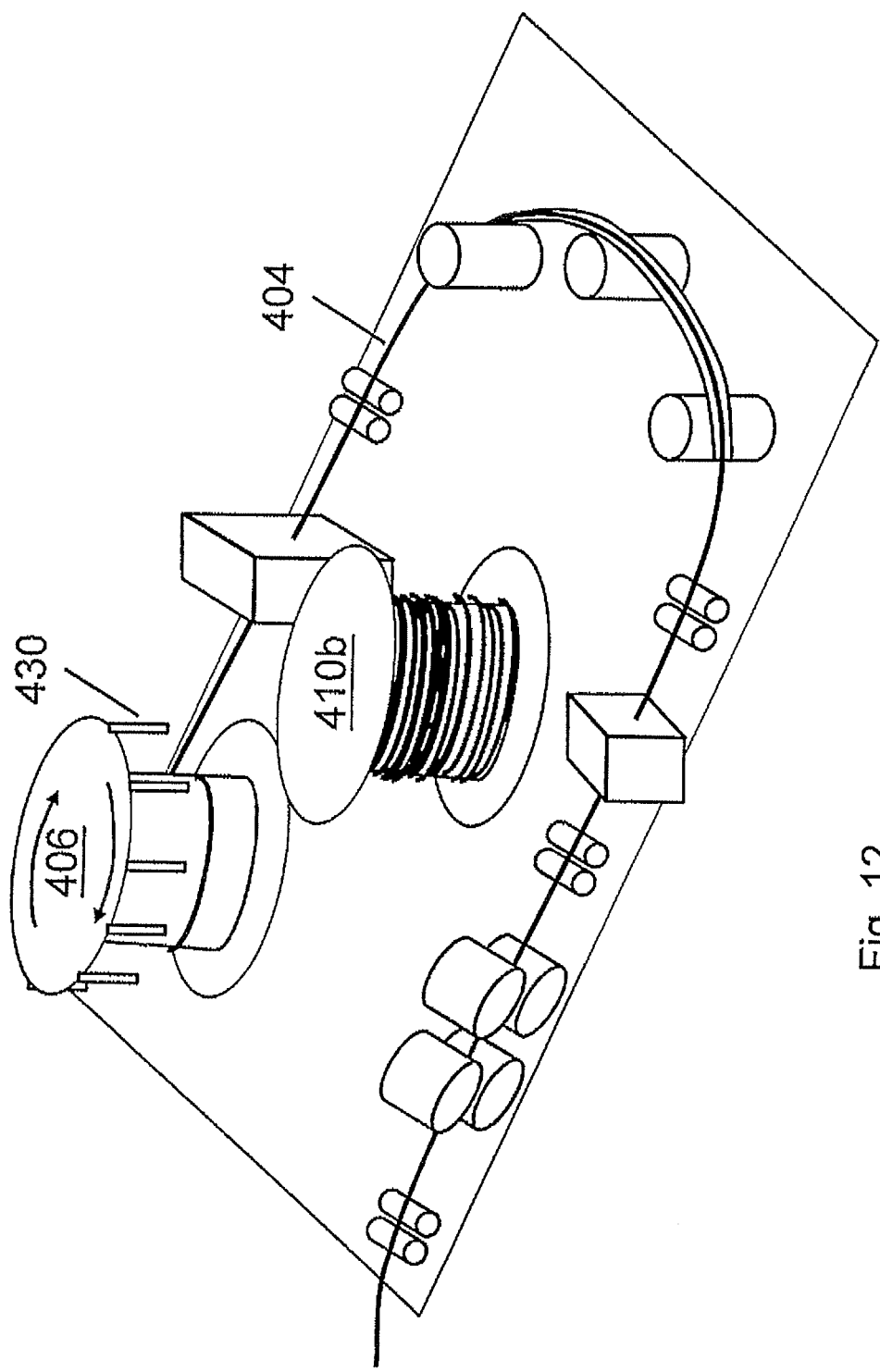
Figure 13:
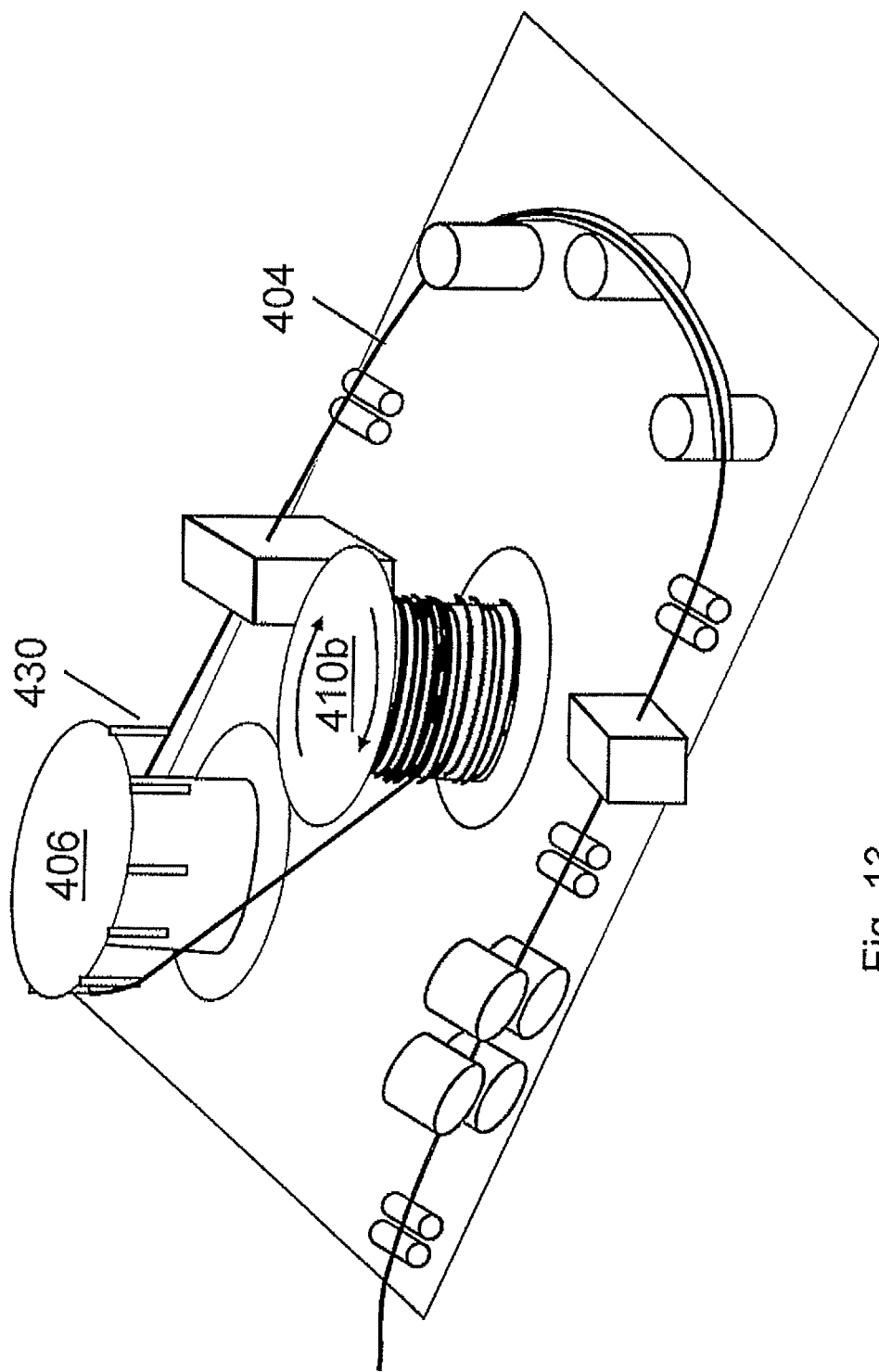

FIGS. 8 to 13 show a vessel according to a fourth embodiment, similar to the second embodiment, the principal difference being that the reel 410 at the second reel station is removably mounted on the vessel. Thus the reel 406 at the first reel station is provided with guide members 430 for guiding the pipe around the periphery of the reel 406 at the first reel station when paying out pipe from a reel 410 at the second reel station. The vessel can be used to lay pipe from three reels in succession, as will now be described. Initially (see FIG. 8) pipe is laid from a rotating reel 410a at the second reel station, via the guide members on the reel 406 (not rotating) at the first reel station. FIG. 9 shows the reel 410a at the second reel station at the instant just before the reel 410a is empty and FIG. 10 shows the subsequent step of laying pipe from the reel 406 at the first reel station, when the reel 406 at the first reel station is rotating and the reel 410a at the second reel station is stationary. As shown in FIG. 11, whilst the pipe 404 is being laid from the reel 406 at the first reel station, the reel 410a at the second reel station is removed so that it can be replaced with a full reel 410b (see FIG. 12). When the reel 406 at the first reel station is empty, laying of pipe can be recommenced from the replacement reel 410b at the second reel station, as shown in FIG. 13.

With reference to the second to fourth embodiments, it will be appreciated that, between finishing laying from one reel and starting laying from another reel, there will be a step of joining the pipe ends together so as to form a single continuous length of pipeline, as described in relation to the first embodiment.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

All of the embodiments described relate to laying of pipe. It will be appreciated of course that other forms of conduit may be laid from reels on a pipe-laying reel vessel. For example, the pipe-laying vessel could lay umbilical from its reel(s). If the vessel is used to lay flexible pipeline it may be unnecessary to provide pipe-straighteners on deck. Whilst the reels and all items of pipe-handling equipment are arranged on an upper deck in the illustrated embodiments, it may be possible for some items to be mounted on other parts, or decks, of the vessel. If the vessel is in the form of a semi-submersible vessel, the vessel may not have a discernable width or length. Other modification and variations will of course be apparent to the skilled reader.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of laying conduit at sea from a reel vessel, wherein the method includes the steps of:
   laying conduit from a first reel of conduit, the first reel rotating about a first substantially vertical axis, and
   laying conduit from a second reel of conduit, the second reel rotating about a second substantially vertical axis that is spaced apart from the first substantially vertical axis in a direction along the length of the vessel and that is offset from the first substantially vertical axis in a direction across the width of the vessel,
   wherein a portion of the route travelled on the vessel by the conduit during the step of laying conduit from the first reel of conduit is substantially the same as a portion of the route travelled by the conduit during the step of laying conduit from the second reel of conduit.

2. A method according to claim 1, wherein the conduit from the second reel passes around at least part of the periphery of the first reel.

3. A method according to claim 2, wherein the step of laying conduit from the second reel of conduit includes rotating both the first reel and rotating the second reel.

4. A method according to claim 2, wherein the step of laying conduit from the second reel of conduit includes passing conduit via one or more guide members positioned around the periphery of the first reel.

5. A method according to claim 4, wherein the one or more guide members used when performing the step of laying conduit from the second reel of conduit are different from the means used to guide the conduit when performing the step of laying conduit from the first reel of conduit.

6. A method according to claim 1, wherein the method includes a step of laying conduit from a third reel of conduit, the third reel rotating about a third substantially vertical axis.

7. A method according to claim 6, wherein the third substantially vertical axis is spaced apart from both the first and second substantially vertical axes.

8. A method according to claim 1, wherein at least one of the first reel and the second reel is fixed on the vessel and arranged whereby, when replenishing the vessel with conduit for laying, the conduit needs to be spooled onto the reel in situ on the vessel.

9. A method according to claim 1, wherein at least one of the first reel and the second reel is removably mounted on the vessel whereby, when replenishing the vessel with conduit for laying, an empty reel may be substituted with a replacement reel with conduit already wound thereon.

10. A method according to claim 1, including a step of laying conduit from one of the first reel and the second reel whilst simultaneously replacing the other of the first reel and the second reel with a further reel of conduit.

11. A vessel for laying conduit at sea, wherein the vessel comprises:
   a first reel station defining a first substantially vertical reel axis, and
   a second reel station defining a second substantially vertical reel axis that is spaced apart from the first substantially vertical reel axis in a direction along the length of the vessel and that is offset from the first substantially vertical reel axis in a direction across the width of the vessel,
   the vessel being adapted such that a first lay route for laying conduit is defined from the first reel station to a launch position and such that a second lay route is defined from the second reel station to a launch position, the second lay route at least partially overlapping with the first lay route.

12. A vessel according to claim 11, wherein the vessel includes a first reel mounted at the first reel station and a second reel mounted at the second reel station.

13. A vessel according to claim 12, wherein at least one of the first reel and the second reel is permanently mounted on the vessel.

14. A vessel according to claim 11, wherein at least one of the first reel station and the second reel station is configured for receiving removable mountable reels.

15. A vessel according to claim 11, wherein the vessel includes a conduit straightening device downstream of the first reel station, both the first lay route and the second lay route including a portion that extends via the conduit straightening device.

16. A vessel according to claim 11, wherein the vessel includes a conduit tensioning device downstream of the first reel station, both the first lay route and the second lay route including a portion that extends via the conduit tensioning device.

17. A vessel according to claim 11, wherein at least a majority of the second lay route overlaps with the first lay route.

18. A vessel for laying conduit at sea, wherein the vessel comprises:
   a first reel station defining a first substantially vertical reel axis, and
   a second reel station defining a second substantially vertical reel axis that is spaced apart from the first substantially vertical reel axis in a direction along the length of the vessel and that is offset from the first substantially vertical reel axis in a direction across the width of the vessel, and wherein
   the vessel is adapted such that a first lay route for laying conduit is defined from the first reel station to a launch position and such that a second lay route is defined from the second reel station to a launch position, the second lay route passing around at least part of the periphery of the first reel station.

19. A vessel according to claim 18, wherein at least a majority of the second lay route overlaps with the first lay route.

20. A method of laying conduit at sea from a reel vessel, wherein the method includes the steps of:
   laying conduit from a first reel of conduit, the first reel rotating about a first substantially vertical axis, and
   laying conduit from a second reel of conduit, the second reel rotating about a second substantially vertical axis that is spaced apart from the first substantially vertical axis in a direction along the length of the vessel and that is offset from the first substantially vertical axis in a direction across the width of the vessel, and wherein
   the conduit from the second reel passes around at least part of the periphery of the first reel.

21. A method according to claim 20, wherein the step of laying conduit from the second reel of conduit includes rotating both the first reel and rotating the second reel.

22. A method according to claim 20, wherein the step of laying conduit from the second reel of conduit includes passing conduit via one or more guide members positioned around the periphery of the first reel.

23. A method according to claim 22, wherein the one or more guide members used when performing the step of laying conduit from the second reel of conduit are different from the means used to guide the conduit when performing the step of laying conduit from the first reel of conduit.

* * * * *